United States Patent [19]

Morr

[11] 3,968,556
[45] July 13, 1976

[54] WEDGE FEEDING MECHANISM FOR SHORT STROKE DYNAMOELECTRIC MACHINE COIL AND WEDGE INSERTING APPARATUS

[75] Inventor: Charles W. Morr, Fort Wayne, Ind.

[73] Assignee: Essex International, Inc., Fort Wayne, Ind.

[22] Filed: Nov. 7, 1975

[21] Appl. No.: 629,722

[52] U.S. Cl. .......................... 29/205 D; 29/205 E
[51] Int. Cl.² ...................................... H02K 15/10
[58] Field of Search .......... 29/205 R, 205 D, 205 E, 29/596, 606

[56] References Cited
UNITED STATES PATENTS

| 3,805,357 | 4/1974 | Peters | 29/205 E |
| 3,872,568 | 3/1975 | Morr | 29/205 D |

*Primary Examiner*—Carl E. Hall
*Attorney, Agent, or Firm*—Robert D. Sommer; Lawrence E. Freiburger

[57] ABSTRACT

Wedge feeding means for a short stroke dynamoelectric machine coil and wedge inserting apparatus of the type in which the slot wedges for an internally slotted dynamoelectric machine stator core member are inserted into the stator in a two stroke movement. The wedge feeding mechanism includes front and rear wedge pushing elements which are moved by a hydraulic ram. With each forward thrust of the hydraulic ram, the front pushing element inserts a group of wedges into the stator core member and the rear pushing element advances a second group of wedges to an intermediate position. As the hydraulic ram is retracted, the front wedge pushing element cams along the underside of the wedges located at the intermediate position in returning to its initial position. With the next stroke of the hydraulic ram, the front pusher element engages the wedges at the intermediate position and the rear pusher element engages a new group of wedges to move both groups respectively to the stator and the intermediate position.

3 Claims, 8 Drawing Figures

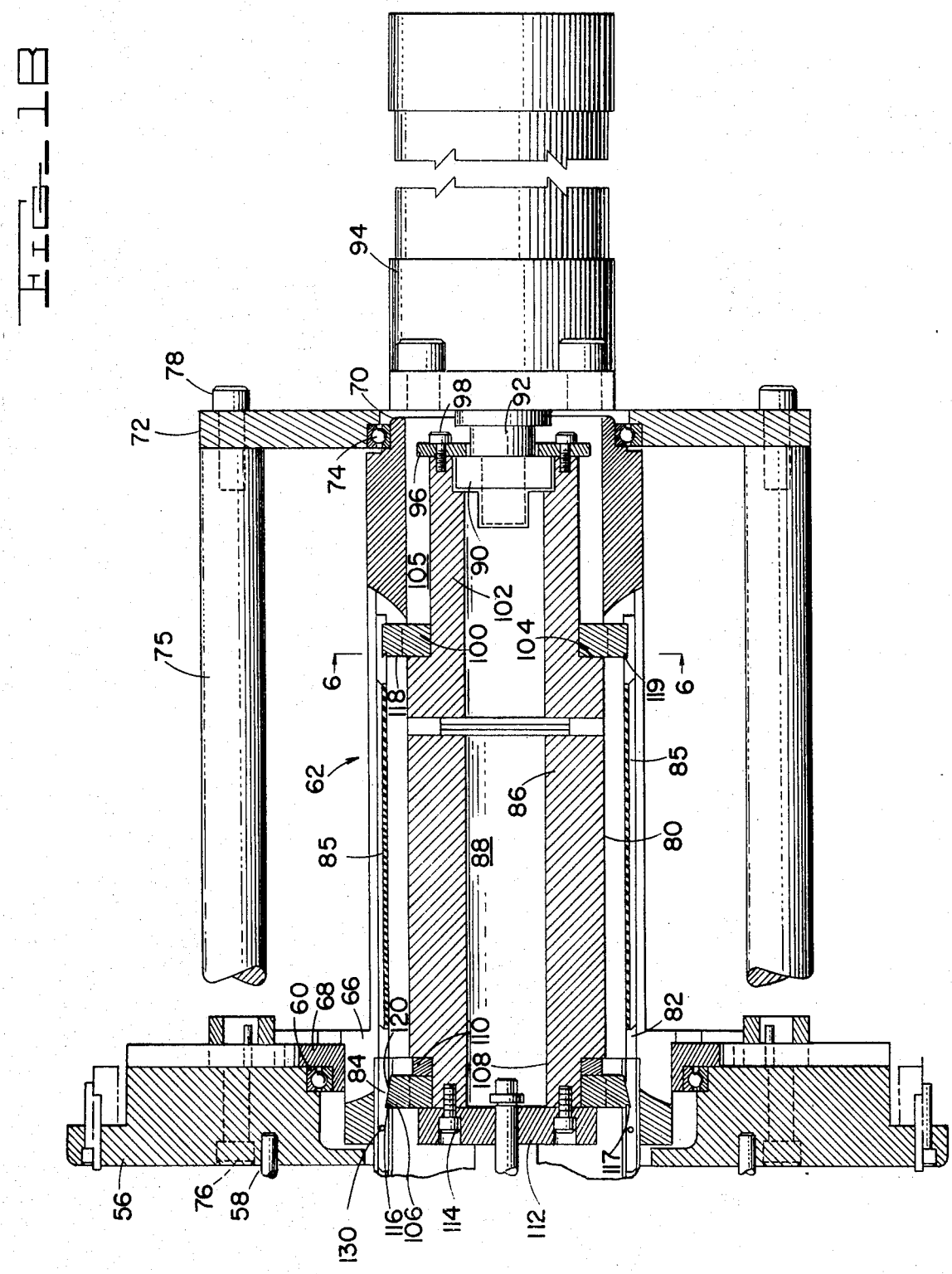

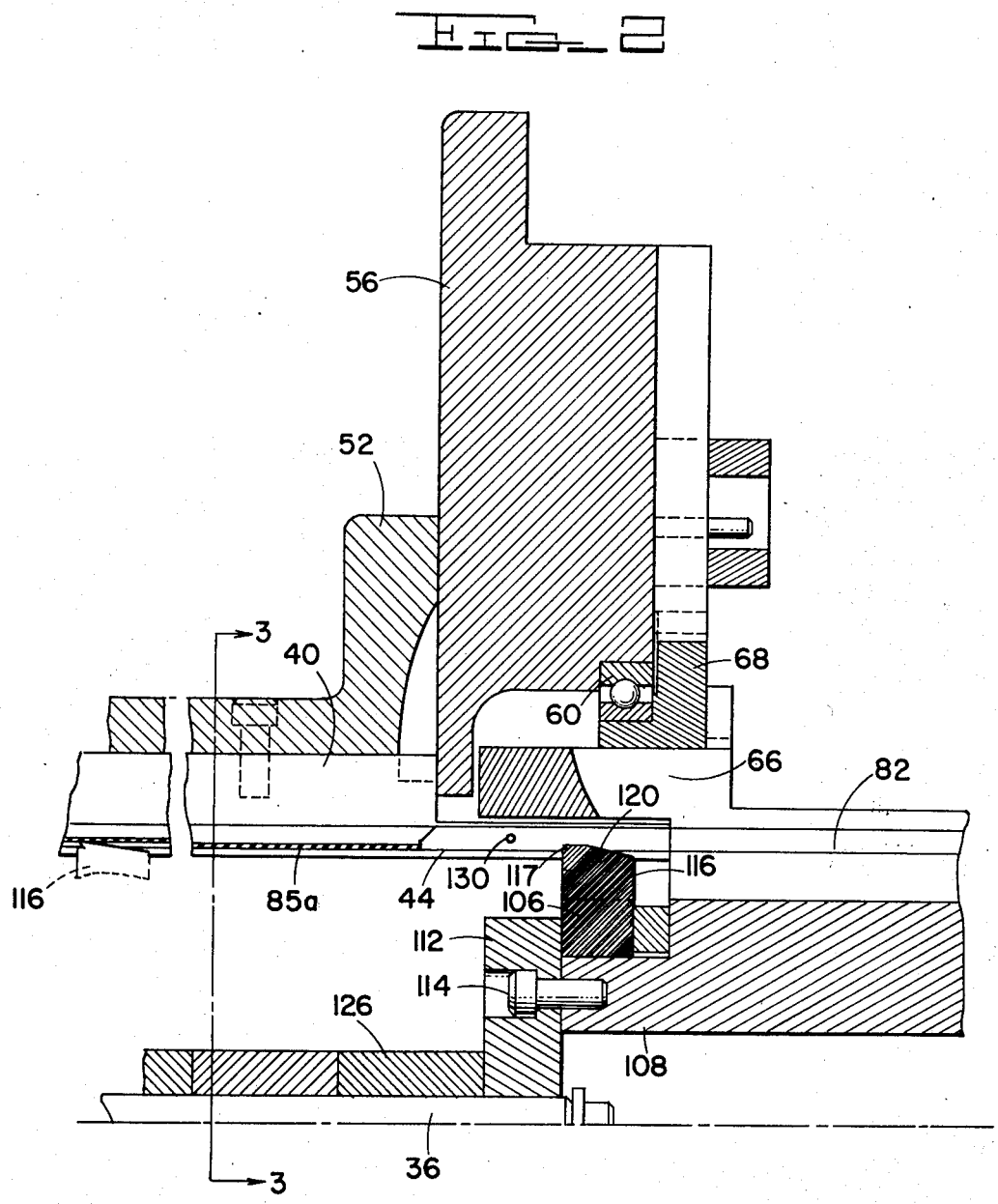

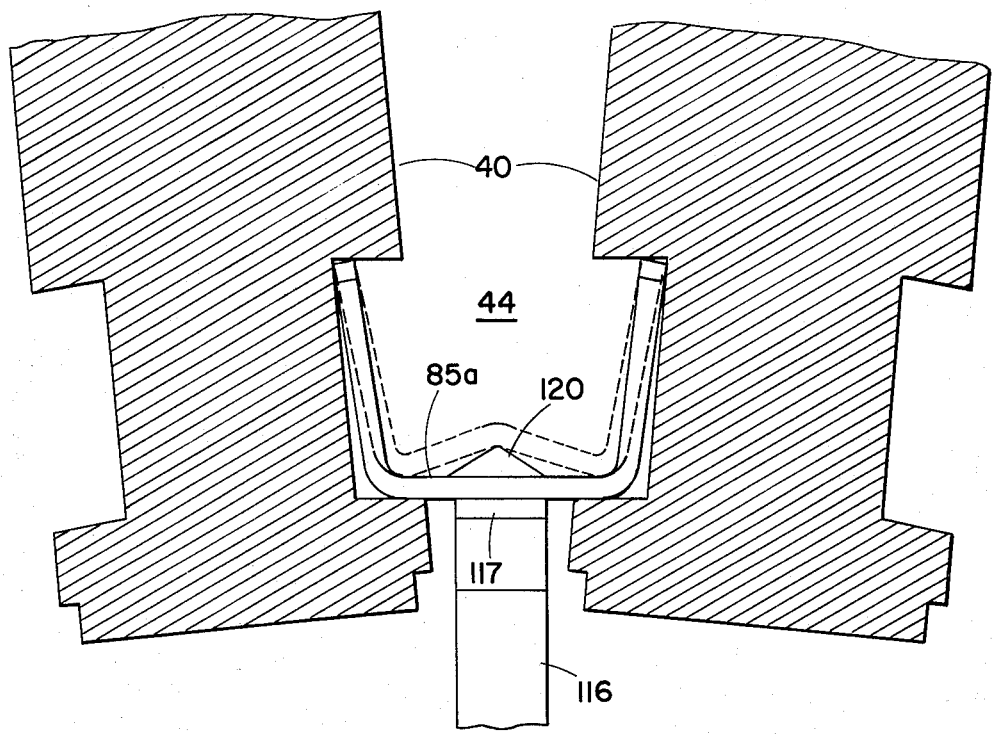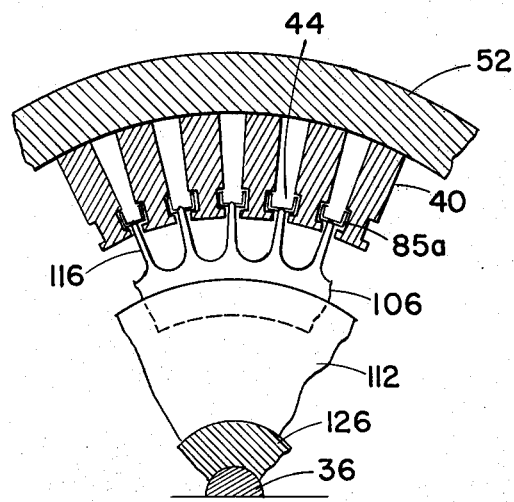

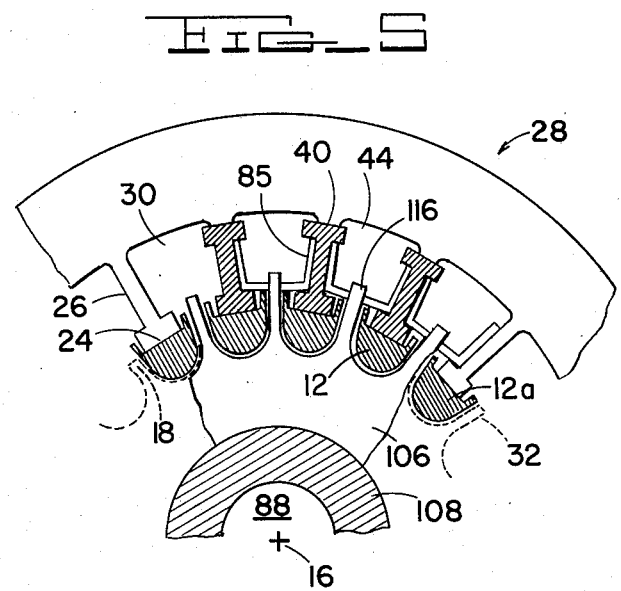
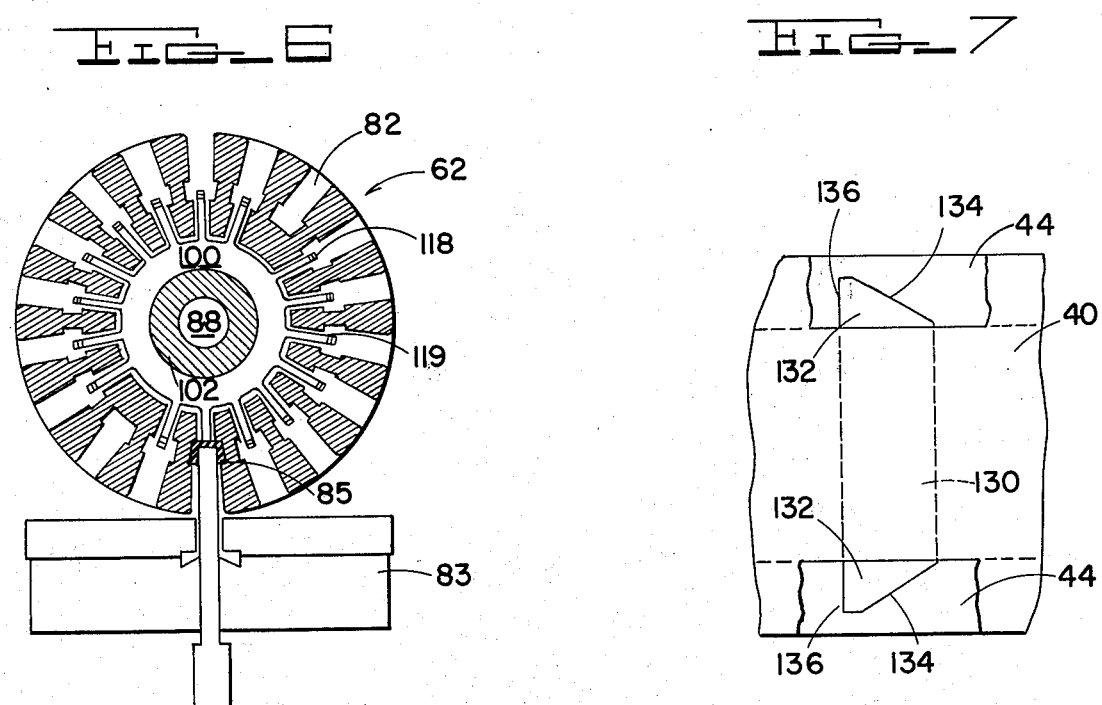

WEDGE FEEDING MECHANISM FOR SHORT STROKE DYNAMOELECTRIC MACHINE COIL AND WEDGE INSERTING APPARATUS

BACKGROUND OF THE INVENTION

1. Field of the Invention

This invention relates generally to apparatus for inserting prewound coil and slot wedges into the slots of an internally slotted dynamoelectric machine core member. More specifically, the present invention relates to an improved simplified wedge feeding mechanism for such devices.

2. Description of the Prior Art

Apparatus for inserting prewound coil into the slots of a dynamoelectric machine stator core member is shown in U.S. Pat. No. 2,432,267, and coil inserting apparatus which also inserts slot wedges into the stator slots following insertion of the coils is further shown in U.S. Pat. Nos. 3,402,462; 3,377,690 and 3,447,225, the latter two patents being assigned to the assignee of the present application.

The wedge feeding mechanism for such apparatus typically comprises a plurality of elongated, small cross-section push rods which axially push the wedges from the wedge magazine slots into wedge guide slots and thereafter into the stator core member in a single stroke. Due to the long stroke required with such machines, and particularly with machines for inserting coil and wedges in stator core members having long stack lengths, such as stator core members for submersible pump motors, it has been necessary to provide additional means for supporting the push rods to prevent buckling thereof as shown in U.S. Pat. No. 3,377,690. Further, inasmuch as the slot wedges sometimes have a tendency to jam in the wedge guide slot or elsewhere it has also been necessary to provide overload means to sense the jamming and remove power from the push rod driving means. Needless to say, the push rod supporting means and overload means substantially contributes to the overall cost of the inserting apparatus.

In order to overcome the disadvantages of the prior art single stroke coil and wedge inserting apparatus, the two stroke coil and wedge inserting apparatus shown in U.S. Pat. No. 3,872,568, which patent is assigned to the assignee of the present application, was developed. The apparatus of this patent provides for front and rear wedge pushing elements which advance first and second groups of wedges to the stator core member and to an intermediate position, respectively, with each forward stroke of the hydraulic ram. In this patent, the front wedge pushing element consists of a plurality of fingers which are movable between radially retracted and protracted positions. On the forward stroke of the ram, the fingers on the front pushing element are radially protracted into the wedge guide slots so as to engage the wedges and move them forward to the stator core member as the front wedge pushing element is advanced by the hydraulic ram. On the retracting stroke of the hydraulic ram, the front pushing element fingers are radially retracted so that they pass under the group of wedges located at the intermediate position without engaging them.

While the coil and wedge inserting apparatus of U.S. Pat. No. 3,872,568 operates satisfactorily for its intended purpose, the intricate nature of the front pushing element requires costly labor time to produce and thus adds to the overall cost of the machine. Further, the intricate nature of the front wedge pushing element increases the chance of a costly equipment failure or that the wedge feeding mechanism might jam.

SUMMARY OF THE INVENTION

It is a primary object of the present invention to provide an improved reliable feeding mechanism for short stroke dynamoelectric machine coil and wedge inserting apparatus of the type in which the wedges are fed from a magazine to an intermediate position on a first stroke and from the intermediate position to the stator core member on a second stroke.

Broadly, the present invention contemplates: reciprocating means for moving first and second wedge pushing elements between initial and final positions, means on the wedge pushing elements for engaging and moving first and second groups of slot wedges to first and second positions, respectively, as the pushing elements are moved forward by the reciprocating means, where the second position is forward of the initial position of the first pushing element, and camming means on the first pushing element which allows it to move from its final position to its initial position on the return stroke of the reciprocating means without engaging the wedge located at the second position by deflecting the wedges away from the first pushing element.

In the preferred embodiment of the invention, front and rear wedge pushing elements are provided which are both driven by the hydraulic ram. The front wedge pushing element advances slot wedges located at an intermediate position from the intermediate position and inserts them into the stator core member on forward strokes of the hydraulic ram. Also, on the forward stroke of the ram the rear wedge pushing element advances a group of wedges from a wedge magazine to the intermediate position. In accordance with the present invention, both the front and rear wedge pushing elements include a plurality of radial fingers extending into longitudinal openings in the wedge guide slots in the wedge magazine and the inserter blade housing assembly. The radial fingers include a notch near the end of the front face of the finger which is adapted to engage the end of the flat base portion of slot wedges located in the guide slots as the wedge pushing element is moved forward. Each radial finger on the front wedge pushing element also includes a camming surface on the end thereof which slopes downwardly from front to rear and which cams along the underside of slot wedges located at the intermediate position as the front wedge pushing element is retracted by the hydraulic ram.

It will be seen that the present invention provides an improvement over the wedge feeding mechanism of U.S. Pat. No. 3,872,568. The wedge feeding mechanism of the present invention is much less intricate than the prior art wedge feeding mechanism and, consequently, is more reliable. Further, the present invention provides a wedge feeding mechanism which is much less costly to produce than the prior art mechanism.

BRIEF DESCRIPTION OF THE DRAWINGS

In the course of the detailed description of the invention, reference will be made to the drawings in which:

FIGS. 1A and 1B are longitudinal sectional views showing the improved mechanism of the invention;

FIG. 2 is an enlarged partial sectional view showing the improved front wedge pushing element of the present invention;

FIG. 3 is a sectional view taken along lines 3—3 of FIG. 2;

FIG. 4 is an enlarged sectional view showing the cooperation of the front wedge guide element finger and wedges located in a wedge guide slot.

FIG. 5 is a partial cross section taken along lines 5—5 of FIG. 1A showing the front wedge guide element in its forward position;

FIG. 6 is a cross sectional view taken along lines 6—6 of FIG. 1B; and

FIG. 7 is an enlarged elevational view of a portion of one of the wedge guide elements.

DETAILED DESCRIPTION OF THE PREFERRED EMBODIMENT

Figure 1A:
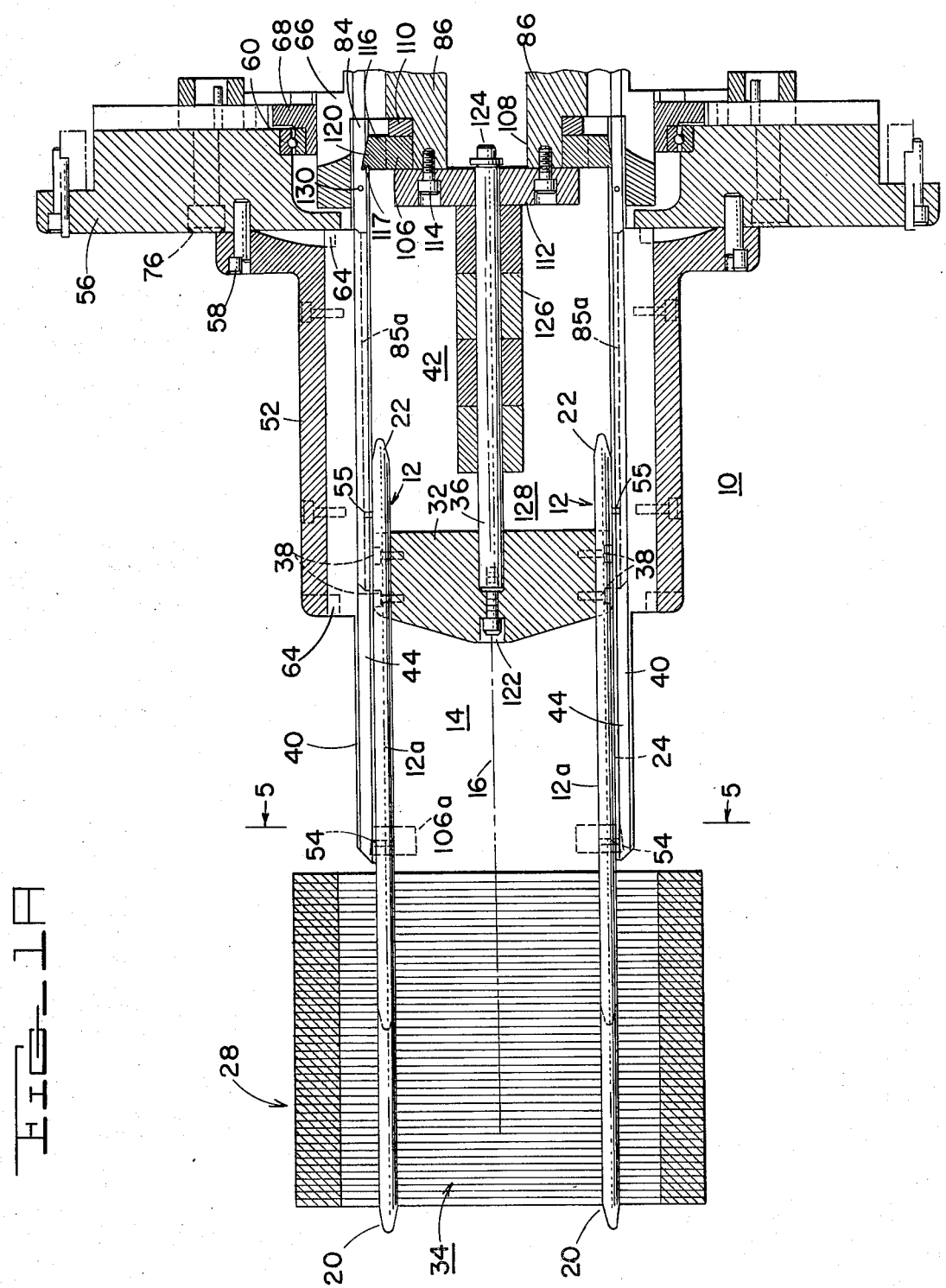

Referring to the drawings FIGURES, the improved coil and wedge insertion apparatus of the invention, generally indicated at 10, comprises a plurality of elongated parallel blade elements 12 spaced around bore 14 having axis 16 and defining axially and radially extending spaces 18 therebetween (FIG. 5). Blades 12 have distal ends 20, rear portions 22, and outer surfaces 24. Outer surfaces 24 of distal end portions 20 of blade elements 12 are adapted to engage the inner ends of teeth 26 of stator core member 28 which define slots 30 therebetween.

Stripper member 32 is adapted to be moved axially through bore 14 and bore 34 of stator core member 28 within blades 12 by push rods 36. Some of the blades 12a may be secured to stripper member 32 by threaded fasteners 38 as is well known in the art, if desired. Additionally, as is well known in the art, the remainder of the blades 12 are all stationary and are attached to wedge guide elements 40. The plurality of elongated parallel wedge guide elements 40 are provided respectively axially aligned with blade elements 12. Wedge guide elements 40 are spaced about bore 42 coaxial with and communicating with bore 14, and define wedge guide slots 44 therebetween in axial and radial alignment with spaces 18 between blade elements 12 and in axial alignment with stator slots 30 (FIG. 5). Wedge guide slots 44 communicate with bore 42. Blades 12 are held in place against wedge guide elements 40 by the stripper 32 which urges the blades 12 radially outwardly against wedge guide elements. Further, pushing element 106 and sleeve member 86 move up to support and urge blades 12 radially outwardly as the stripper 32 is moved into the stator 28. So that the dynamoelectric machine coil and wedge inserting apparatus of the present invention is capable of being used with stator core members of different stack lengths means is provided for axially adjusting the length of blades 12. This adjusting means includes a roll pin 54 located in the outer surface of blades 12 which is received in a corresponding one of a plurality of recesses 55 in a corresponding wedge guide element 40. It will be appreciated that blades 12 are thus easily adjusted simply by urging the blades inwardly against a resilient structure which temporarily replaces stripper 32, to disengage the roll pin 54 from a recess 55 and axially moving the blade to the desired position at which the roll pin 54 engages a new recess.

A base plate member 56 is secured to a housing member 52, as by threaded fasteners 58. Index bearings 60 allow a wedge magazine 62 to be indexed relative to the housing 52 by a suitable index drive motor (not shown) as is well known in the art. A plurality of radial extensions 64 on housing 52 serve to retain and locate wedge guide elements 40.

Wedge magazine 62 is disposed within the housing, has a forward end 66, and is secured, by suitable means, to indexing ratchet wheel 68. Ratchet wheel 68 is thus rotatably mounted on base plate 56 by bearings 60. Rear end 70 of wedge magazine 62 is rotatably mounted on rear support plate 72 by bearings 74. Rear support plate 72 is attached to plate 56 by support members 75 by threaded fasteners 76 and 78.

Wedge magazine 62 has central bore 80 formed therein coaxial with and communicating with bore 42. Axially extending wedge forming and guide slots 82 are formed in wedge magazine 62 so that they radially communicate with bore 80 and are in axial alignment with wedge guide slots 44 defined by wedge guide elements 40. Rear ends 84 of wedge guide elements 40 extend axially into central openings in hub 66 with wedge guide slots 44 being aligned with slots 82 so that wedges may pass from slots 82 into slots 44.

A wedge making mechanism 83 which may be of the type more fully shown and described in U.S. Pat. No. 3,447,225 is preferably provided for initially forming wedges 85 in wedge magazine slots 82. Thus, preferably, the wedges 85 are formed in each of the slots 82 individually by a wedge making mechanism as the magazine is indexed through a plurality of positions.

The apparatus thus far described is conventional and does not, except in combination, form a part of the present invention.

In accordance with the present invention, tubular sleeve member 86 is seated in bore 80 of magazine 62 for axial movement therein. Sleeve member 86 has central bore 88 formed therein. Bore 88 is enlarged at the end thereof so that a collar 90 on piston 92 of hydraulic cylinder 94 is entrapped in the enlarged bore by a plate 96 secured to the end of tubular sleeve member 86 by threaded fasteners 98. Thus, tubular sleeve member 86 is firmly attached to piston rod 92 so that it moves therewith. Rear wedge pushing member 100 is located axially on end portion 102 of sleeve member 86 such that it is slidable thereon between an abutment shoulder 104 on sleeve member 86 and plate member 96 so as to provide a lost motion connection 105 between sleeve member 86 and wedge pushing member 100. A front wedge pushing member 106 is axially located on a forward extension 108 of sleeve member 86 and is held in place between a spacer 110 and a plate member 112 which is attached to sleeve member 86 by suitable means such as threaded fasteners 114.

The front and rear wedge pushing elements 106 and 100, respectively, each include a plurality of radially outwardly extending fingers, 116 and 118 respectively, which are adapted to extend into the magazine wedge guide slots 82 and wedge guide slots 44 so as to engage wedges located in the slots and move them forward as the pushing elements are moved forward. Each of the fingers 116 and 118 have a notch, 117 and 119, respectively, near the end thereof which is adapted to engage the base portion of a slot wedge as the finger is moved forward. The ends of fingers 118 define a plane which is generally parallel to the axis of the wedge magazine 62. The ends of fingers 116, however, form a camming surface 120 which slopes toward the axis of wedge magazine 62 from front to rear. The purpose of camming surface 120 will become evident as the operation of the device is described.

Pushrod 36 is secured to stripper member 32 by any suitable means such as threaded fastener 122 and extends axially through a central bore in plate 112. A threaded cap member 124 is secured on the end of push rod 32 within bore 88. A spacer 126 surrounds push rod 36 so as to provide lost motion space 128 between the forward end of spacer 126 and stripper 32. Thus, as the tubular member 86 is moved forward, stripper 32 will not move forward until spacer 126 takes up lost motion space 128.

The operation of the device will now be described in conjunction with the drawings FIGURES. In this description of the operation, it will be assumed that the magazine 62 has been indexed through its plurality of positions such that a wedge is loaded in each of the magazine guide slots 82. It will also be assumed that on the previous stroke of the hydraulic ram a group of wedges had been advanced from the magazine 62 to the position indicated in FIG. 1A by reference numeral 85a. With a forward stroke of piston rod 92, sleeve member 86 will immediately begin to move forward, thus moving front wedge pushing element 106 in the forward direction. When the front wedge pushing member 106 reaches the group of wedges indicated by reference numeral 85a, the wedges 85a are engaged in notches 117 so that they are moved forward and are inserted into the stator core member when the front pushing member 106 reaches the position indicated by reference numeral 106a. At the same time, forward movement of piston rod 92 will take up lost motion space 105 and rear wedge pushing element 100 will engage wedges 85 to move them to the position indicated by reference numeral 85a. Also, it will be appreciated that, at the same time, sleeve member 86 will move spacer 126 forward to take up lost motion space 128 and move stripper member 32 forward to strip the coils from blades 12 and inject them into the stator core 28 as is well known in the art.

On the return stroke of piston 92, the lost motion connection between rear wedge pushing element 100 and sleeve member 86 will allow wedge pushing element 100 to slide on portion 102 until it meets abutment shoulder 104, at which point the wedge pushing element 100 is moved to the position shown in FIG. 1B when piston 92 is completely retracted. In a similar manner, the lost motion connection between push rod 36 and sleeve 86 allows some return motion of piston rod 92 until stripper 32 actually begins to move to its retracted position. It will be appreciated that on the return stroke of piston rod 92, front wedge pushing element will be moved from position 106a, past the group of wedges located at position 85a, and to the position shown in FIGS. 1A and 1B. Referring to FIGS. 2 and 4, it will be seen that as the front wedge pushing element 106 moves from its forward position 106a to its retracted position, camming surface 120 of each finger 116 will cam along the underside of wedges 85a so as to deflect wedges 85a into wedge guide slots 44 as shown in FIGS. 2 and 4 in the dotted lines.

In order to ensure that the front wedge pushing element 106 does not pull wedges 85a along with it when fingers 116 cam underneath them, means may be provided to prevent movement of wedges 85a toward the rear. Referring to FIG. 7, each of the wedge guide elements 40 may be provided with a pin 130 extending transversely thereacross with the ends 132 extending slightly into slots 44. The ends 132 are preferably beveled at 134 so that the wedges easily pass ends 132 as they are moved in the forward position but are caught by the flat front face 136 of pins 130 if they move toward the rear. It has been found that pins 130 are not necessary, but they may be employed to ensure that the wedges 85a are not moved backward under any condition.

It will be appreciated by those skilled in the art that the above described invention provides a simplified, economical and reliable wedge pushing mechanism that obviates the need for the front wedge pushing element to be a complicated mechanism which is retractable and protractable into the wedge guide slots. Further, due to the short stroke of the above-described inserting apparatus such apparatus may be mounted vertically, thus occupying less floor space.

While a preferred form of the invention has been described above, obvious modifications will occur to those skilled in the art. For example, the pushing element fingers need not necessarily engage the base portion of the slot wedges to move them forward. It is contemplated by the present invention that the pushing element fingers can engage any portion of the slot wedges. Further, the present invention is not necessarily limited to the situation where the slot wedges are moved in a two stroke movement from the wedge magazine to the stator. For example, in a modification of the invention, the slot wedges may be formed and axially inserted into the wedge magazine by a pusher element and moved to the intermediate position by a second pusher element, thus requiring that the second pusher element having a camming surface thereon. It is intended therefore, that the above description is made for exemplary purposes only and not as a limitation to the scope of the invention.

What is claimed is:

1. In apparatus for inserting prewound coils and slot wedges into the slots of an internally slotted dynamoelectric machine stator core member, said apparatus including a plurality of elongated, axially extending parallel blade elements defining a bore having an axis and having outer surfaces, said blade elements being spaced about said bore and defining radially and axially extending spaces therebetween, said blade elements having distal ends and rear portions, the outer surfaces of said distal ends being adapted to engage the inner ends of the teeth of a stator core member which define said slots with the spaces between said blade elements being in axial alignment with and communicating with respective slots, a plurality of elongated, axially extending, parallel slot wedge guide elements respectively in axial and radial alignment with said blade elements and defining first wedge guide slots therebetween respectively in axial and radial alignment with said blade element spaces and in axial alignment with said stator core member slots, said guide elements respectively abutting the outer surfaces of the rear portions of said blade elements and having forward ends which are spaced rear-wardly from said distal ends of said blade elements and also having rear portions, a coil stripper member mounted for axial movement in said bore, first means for moving said stripper member axially through said bore within said blade elements, means extending rear-wardly from said rear portions of said wedge guide members for receiving slot wedges and having a plurality of elongated, axially extending, second wedge guide slots formed therein adapted respectively to receive slot wedges at a first location, said second wedge guide slots being respectively in axial alignment with said first wedge guide slots and communicating therewith, first means for pushing said slot wedges forwardly from said first location through said second wedge guide slots to a second location in said first wedge guide slots spaced rearwardly from said forward ends of said wedge guide elements, second means spaced axially forwardly from said first pushing means for pushing said slot wedges forwardly from said second location through said first wedge guide slots and to a third location, and reciprocating means for moving said first and second pushing means forward and for returning the same to push a first group of slot wedges from said second location to said third location as a second group of slot wedges are pushed from said first location to said second location on the forward stroke of said reciprocating means; the improvement wherein said second pushing means comprises a rigid pushing element axially movable between rear and forward positions and having a plurality of fingers extending radially therefrom, one each of said fingers extending into said wedge guide slots, means on each of said fingers for engaging said slot wedges when said pushing element is moved forwardly to move said slot wedges forward, and camming means on each of said fingers for preventing said fingers from engaging and moving the slot wedges at said second location rearwardly as said pushing element is returned to its rear position.

2. The device as claimed in claim 1, wherein said camming means comprises the end face of said fingers, said end face being sloped inwardly from front to rear with the rear portion of said end face being located radially inwardly from said slot wedge, and said engaging means comprises a notch in the end of each finger adapted to engage the base portion of said slot wedges.

3. The device as claimed in claim 1, wherein said third location comprises said stator core slots.

* * * * *